United States Patent
Whisenhunt et al.

(10) Patent No.: US 7,536,314 B2
(45) Date of Patent: May 19, 2009

(54) SYSTEM AND METHOD FOR PROCESSING WORK ACCORDING TO AN ACTIVE WORK MODEL

(75) Inventors: William O. Whisenhunt, Coppell, TX (US); Blair E. Nygren, Coppell, TX (US); Abhay S. Shah, Irving, TX (US)

(73) Assignee: eTalk Corporation, Dallas, TX (US)

( * ) Notice: Subject to any disclaimer, the term of this patent is extended or adjusted under 35 U.S.C. 154(b) by 1070 days.

(21) Appl. No.: 10/072,431

(22) Filed: Feb. 8, 2002

(65) Prior Publication Data
US 2003/0154241 A1    Aug. 14, 2003

(51) Int. Cl.
*G06F 9/46*    (2006.01)
(52) U.S. Cl. ........................................................ 705/8
(58) Field of Classification Search .................... 705/9, 705/8
See application file for complete search history.

(56) References Cited

U.S. PATENT DOCUMENTS

| | | | | |
|---|---|---|---|---|
| 5,793,861 | A | 8/1998 | Haigh | 379/266 |
| 5,946,375 | A | 8/1999 | Pattison et al. | 379/34 |
| 5,963,911 | A * | 10/1999 | Walker et al. | 705/7 |
| 6,058,163 | A | 5/2000 | Pattison et al. | 379/34 |
| 6,134,530 | A * | 10/2000 | Bunting et al. | 705/7 |
| 6,263,049 | B1 | 7/2001 | Kuhn | 379/34 |
| 6,356,880 | B1 * | 3/2002 | Goossens et al. | 705/30 |
| 6,389,400 | B1 * | 5/2002 | Bushey et al. | 705/7 |
| 6,401,073 | B1 * | 6/2002 | Tokuda et al. | 705/8 |
| 6,442,567 | B1 | 8/2002 | Retallick et al. | 707/104 |
| 6,542,602 | B1 | 4/2003 | Elazar | 379/265.06 |
| 6,574,661 | B1 | 6/2003 | Delano et al. | 709/223 |
| 6,640,145 | B2 | 10/2003 | Hoffberg et al. | 700/83 |
| 6,673,104 | B2 | 1/2004 | Barry | 623/1.15 |
| 6,707,904 | B1 | 3/2004 | Judkins et al. | 379/265.06 |
| 6,763,104 | B1 | 7/2004 | Judkins et al. | 379/265 |
| 6,801,618 | B2 | 10/2004 | Nygren et al. | 379/265.06 |
| 6,850,895 | B2 * | 2/2005 | Brodersen et al. | 705/9 |

(Continued)

FOREIGN PATENT DOCUMENTS

EP    1 016 998 A2    7/2000

(Continued)

OTHER PUBLICATIONS

Dix, John; "Teaming with Technology", Network World, Jan. 10, 1994.*

(Continued)

*Primary Examiner*—Romain Jeanty
(74) *Attorney, Agent, or Firm*—Baker Botts L.L.P.

(57) ABSTRACT

In one embodiment of the present invention, a system for processing work items includes a dispatcher operable to receive a plurality of messages and determine if any of the messages is associated with a work assignment. The system also includes an active work server communicatively coupled to the dispatcher and operable to receive work information associated with at least one message determined by the dispatcher to be associated with a work assignment. The active work server is further operable to create a work item associated with the at least one message based at least in part upon the work information, wherein the work item comprises an owner identifier. The active work server further communicates the work item to an owner associated with the owner identifier.

33 Claims, 3 Drawing Sheets

U.S. PATENT DOCUMENTS

| | | | |
|---|---|---|---|
| 2001/0012356 A1 | 8/2001 | Mcduff et al. | 379/265.02 |
| 2002/0071529 A1 | 6/2002 | Nelkenbaum | 379/88.13 |
| 2003/0023675 A1* | 1/2003 | Ouchi et al. | 709/203 |
| 2003/0126001 A1* | 7/2003 | Northcutt et al. | 705/8 |

FOREIGN PATENT DOCUMENTS

| | | |
|---|---|---|
| WO | WO 01/54388 A1 | 7/2001 |
| WO | WO 01/60027 A2 | 8/2001 |
| WO | WO 01/75747 A1 | 10/2001 |

OTHER PUBLICATIONS

International Search Report in International Application No. PCT/US 03/01684 dated Jun. 2, 2003, 8 pages.

International Search Report in International Application No. PCT/US 03/01685 dated Jun. 4, 2003, 8 pages.

Ronni T. Marshak, "IBM's FlowMark Object-Oriented Workflow for Mission-Critical Applications," *Workgroup Computer Report*, vol. 17, No. 5, XP000568699, May 1994, 11 pages.

David Hollingsworth, "The Workflow Reference Model," Document No. TC00-1003, *Workflow Management Coalition*, Jan. 19, 1995, 55 pages.

Kerry W. Hassler et al., "Revolutionizing Definity® Call Centers in the 1990s," *AT&T Technical Journal*, Jul./Aug. 1995, 10 pages.

PCT International Search Report in International Application No. PCT/US 03/01759, dated Nov. 14, 2003, 7 pages.

Patent Pending U.S. Appl. No. 10/072,408, entitled System and Method for Implementing Recording Plans Using a Presence-Based Plan Manager by Blair Nygren; 51 pages, plus 5 pages of drawings, Feb. 8, 2002.

Dix, John; *Teaming With Technology*; Network World, vol. 11, No. 2; pp. SS8-SS16; ISBN: 0887-7661, Jan. 20, 1994.

Dix, John; *Teaming With Technology*; Network World, Jan. 10, 1994; http://www.findarticles.com, Last visited Nov. 6, 2006.

* cited by examiner

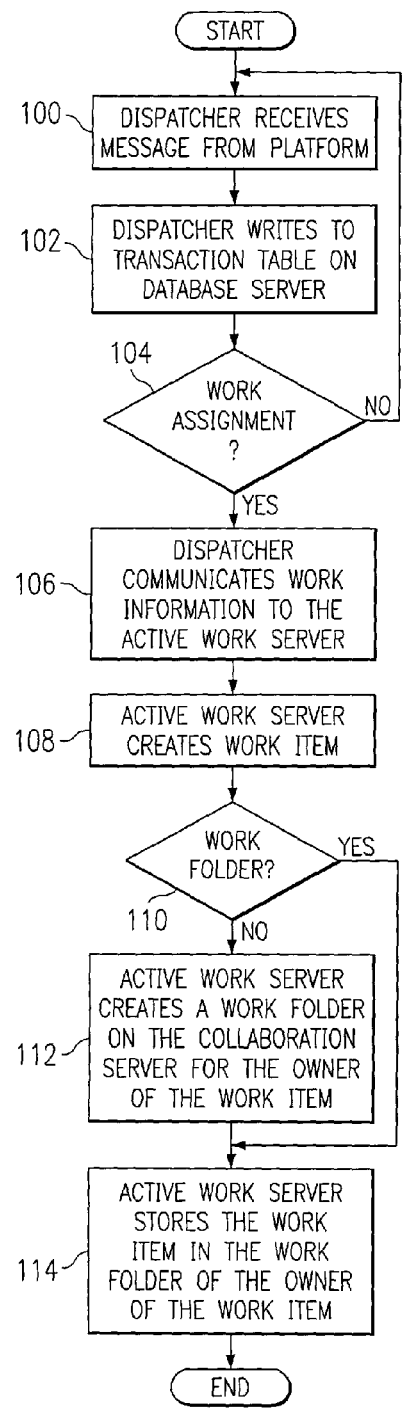
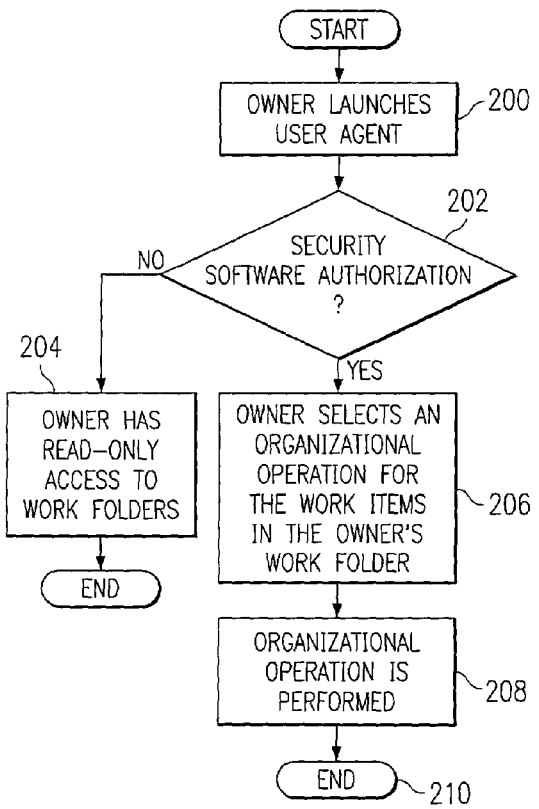

US 7,536,314 B2

SYSTEM AND METHOD FOR PROCESSING WORK ACCORDING TO AN ACTIVE WORK MODEL

RELATED APPLICATIONS

This application is related to and filed concurrently with U.S. application Ser. No. 10/072,408, entitled "System and Method for Implementing Recording Plans Using a Presence-Based Plan Manager", and pending U.S. application Ser. No. 10/071,555, entitled "System and Method for Implementing Recording Plans Using a Session Manager". These applications have been commonly assigned to e-talk Corporation.

TECHNICAL FIELD OF THE INVENTION

This invention relates generally to communication systems, and more particularly to a system for processing work according to an active work model.

BACKGROUND OF THE INVENTION

Communication systems require quality managers to search for work to review and perform. This model of performing work may be referred to as a "passive work" model. A drawback to this "passive work" model is that it often results in inefficient and untimely quality management and fails to track and manage the functions of the quality management process. Furthermore, the "passive work" model relies on the diligence of quality managers to pursue and complete work.

SUMMARY OF THE INVENTION

According to the present invention, disadvantages and problems associated with prior techniques for quality management may be reduced or eliminated.

In one embodiment of the present invention, a system for processing work items includes a dispatcher operable to receive a plurality of messages and determine if any of the messages is associated with a work assignment. The system also includes an active work server communicatively coupled to the dispatcher and operable to receive work information associated with at least one message determined by the dispatcher to be associated with a work assignment. The active work server is further operable to create a work item associated with the at least one message based at least in part upon the work information, wherein the work item comprises an owner identifier. The active work server further communicates the work item to an owner associated with the owner identifier.

Particular embodiments of the present invention may provide one or more technical advantages. For example, standard quality management processes passively assign work to owners responsible for performing that work in what may be referred to as a "passive work" model. This "passive work" model requires owners of work items to proactively check if work is assigned to them. Certain embodiments of the present invention, however, may proactively push work items to an owner responsible for performing the work item. This is referred to as an "active work" model. Proactively pushing work items may increase efficiency in quality management systems by ensuring that an owner of a work item receives notice and information regarding the work item in a timely manner, eliminating the need for owners of work items to seek out their assigned work items. Proactively pushing work items may also allow a work assignment within a work item and the progress made in performing that work assignment to be more easily tracked and monitored. Certain embodiments of the present invention may also facilitate an owner's ability to perform the work assignment by allowing the owner to launch the work assignment from the owner's work folder. Providing this functionality may decrease the burden on owners of work items, easing the owners' ability to perform work assignments. Certain embodiments of the present invention may also allow owners of work items to organize work items according to relevant work parameters.

Systems and methods incorporating one or more of these or other technical advantages may be well suited for communication systems. Certain embodiments of the present invention may provide some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and the advantages thereof, reference is now made to the following descriptions, taken in conjunction with the accompanying drawings in which:

FIG. 3 is a flowchart of a method for processing work;

FIG. 4 is a flowchart of a method for organizing one or more work items; and

DESCRIPTION OF EXAMPLE EMBODIMENTS

Figure 1:
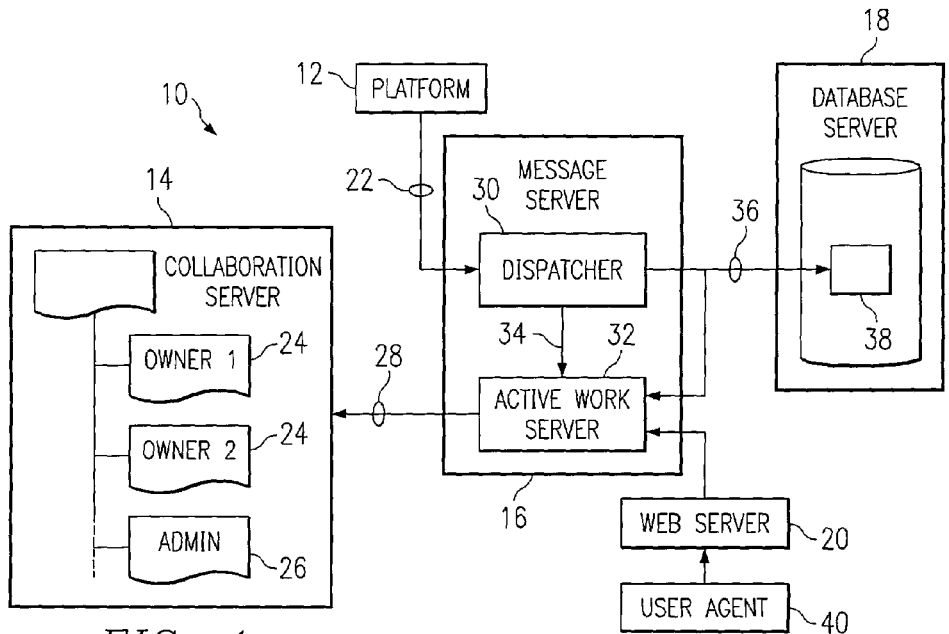
FIG. 1 illustrates one embodiment of a system for processing work in accordance with the present invention.

FIG. 1 illustrates one embodiment of a communication system 10 for processing work. System 10 comprises a message server 16 coupled to a platform 12, a database server 18, a collaboration server 14, and a web server 20. In general, system 10 may be used to implement an "active work" model. In one embodiment, the "active work" model is implemented to generate work items for assignment to participants in a call center environment. It should be understood, however, that system 10 may be implemented in any suitable environment where work is assigned.

In a call center environment, quality control managers, supervisors, and call center representatives may all be assigned work items according to the "active work" model. These participants to system 10 may generally be referred to as clients and may specifically be referred to as owners when they are assigned work items. The work items that may be assigned to owners may be associated with work assignments to be performed with respect to particular activities within a call center environment. The "active work" model departs from traditional "passive work" models in many ways such as, for example, by proactively identifying work assigned to particular owners, creating work items associated with the work assignment, and communicating the work items to the appropriate owners for processing. Furthermore, owners of work items may be able to organize their work items and "launch" applications used to perform the work assignments.

Platform 12, collaboration server 14, message server 16, database server 18, and web server 20 may each comprise an appropriate combination of hardware and software associated with one or more computers at one or more locations. These components of system 10 may share data storage, communications, or other resources according to particular needs. For example, functionality described in connection with platform 12, collaboration server 14, message server 16, database server 18, and web server 20 may be provided using a single computer system, which in a particular embodiment might include a conventional desktop or laptop computer. Furthermore, functionality described in connection with platform 12, collaboration server 14, message server 16, database server 18, and web server 20 may be provided using any suitable software components. Each computer system may include one or more suitable input devices, output devices, mass storage media, processors, memory, or other components for receiving, processing, storing, and communicating information according to the operation of system 10. In a distributed embodiment of system 10, particular components of system 10 may be communicatively coupled to one another using one or more local area networks (LANs), metropolitan area networks (MANs), wide area networks (WANs), a global computer network such as the Internet, or any other wireline, optical, wireless, or other links.

In a call center environment, system 10 contemplates calls or sessions that include voice, data, or voice and data. For example, calls received over telephone switching equipment may include voice conversations, but may also include other associated data. In another embodiment, data switching or routing equipment may provide a purely data session. For purposes of this discussion, the terms "session" and "call" contemplate voice only, data only, or both voice and data transactions. System10 further contemplates sessions wherein a caller to the call center environment completes a survey describing the caller's experience during the call. System 10 further contemplates sessions wherein quality control managers or supervisors complete an evaluation of a call to the call center environment. Platform 12 may comprise a mechanism for scheduling, monitoring, storing, and evaluating these sessions. In one embodiment, platform 12 is described in greater detail in copending U.S. application Ser. No. 10/072,408, entitled, "System and Method for Implementing Recording Plans Using a Presence-Based Plan Manager," which isincorporated herein by reference for all purposes.

Platform 12 generates and communicates one or more session summaries 22 to message server 16. Session summaries 22 may be Extensible Markup Language (XML) documents or any other suitably structured messages. In a call center environment, session summaries 22 generally may be associated with a type of session and may comprise transaction information and work information. For example, session summaries 22 may be associated with a recording session, a survey session, an evaluation session, or any other suitable type of session that involves the performance of a business process. Session summaries 22 associated with a recording session will be referred to as a recording session summary 22; session summaries 22 associated with a survey session will be referred to as a survey session summary 22; and session summaries 22 associated with an evaluation session will be referred to as an evaluation session summary 22.

Recording sessions may include recorded voice and/or data sessions conducted by a client, for example, in a call center environment. A recording session summary 22 may include or be linked to the recorded voice and/or data session. Survey sessions may include, for example, customer surveys completed by callers to a call center. A survey session summary 22 may include or be linked to the completed survey. Evaluation sessions may include some pattern of questions, requests, comments, or any other suitable information presented to a client, for example, in a call center environment. An evaluation session summary 22 may include or be linked to one or more evaluation documents. In a particular embodiment, each of a survey session summary 22 and an evaluation session summary 22 may be linked to one or more recorded voice and/or data sessions. It is understood that a session summary 22 may be associated with more than one type of session.

In a call center environment, session summaries 22 generally comprise transaction information detailing the performance of a session. For example, transaction information may include information about a voice session between a client and a caller to the call center. Transaction information in this example may include a client identifier indicating the client that conducted the the voice session, the time and date of the voice session, workstation information of the client, an indication of whether the session summary 22 includes a work assignment to be performed by an owner (and if so, the name of the owner), and any other suitable transaction information.

Particular session summaries 22 further comprise work information 34 if the session summary 22 is associated with a work assignment. In a particular embodiment, the work assignment may be associated with one or more of completing an evaluation, reviewing a recorded voice and/or data session, and reviewing a survey. The work information 34 may include the instructions to perform the work assignment, links to information and/or applications used to perform the work assignment, a work type indicating the type of work assignment to be performed, an owner identifier indicating the owner responsible for performing the work assignment, and any other suitable information detailing the work assignment to be performed.

Message server 16 comprises a dispatcher 30 coupled to an active work server 32. In general, dispatcher 30 receives session summaries 22 from platform 12 and determines if any session summaries 22 are associated with a work assignment. For each session summary 22 associated with a work assignment, dispatcher 14 forwards work information 34 from the session summary 22 to active work server 32. Dispatcher 30 may also communicate transaction information 36 from each session summary 22 to a transaction table 38 associated with database server 18. In response to receiving work information 34 from a particular session summary 22, active work server 32 creates one or more work items 28 using work information 34 from the particular session summary 22. Active work server 32 communicates work item 28 to the appropriate work folders and/or sub-folders of the owner of the work item 28. The folders are maintained by collaboration server 14.

In certain embodiments, active work server 32 performs different tasks consistent with the "active work" model. For example, active work server 32 facilitates and manages interaction with dispatcher 30 to receive work information 34 and to create, modify, and/or delete work items 28. Active work server 32 may create different types of work items 28 depending on the type of session summary 22 involved. Work item types may include a recording work item 28 generated from a recording session summary 22, a survey work item 28 generated from a survey session summary 22, an evaluation work item 28 generated from an evaluation session summary 22, and any other suitable type of work item 28 generated from any other suitable type of session summary 22. In another example, active work server 32 facilitates and manages interaction with collaboration server 18 to establish work folders 24 for particular owners and to communicate work items 28 to the appropriate work folders 24. In yet another example, active work server 32 facilitates and manages interaction with web server 20 to provide access to work items 28 by the appropriate owners.

System 10 comprises collaboration server 14 coupled to message server 16. Collaboration server 14 comprises any suitable combination of hardware and software that runs MICROSOFT EXCHANGE, LOTUS NOTES, NOVELL GROUPWISE, or any other suitable communications software that provides an arrangement of work folders 24 and/or administrative folders 26. In general, each work folder 24 corresponds to an owner of work items 28. Moreover, each work folder 24 may comprise subfolders that correspond to different types of work items 28. In one embodiment, work folders 24 may be a type of shareable folder provided by the communications software. For example, if collaboration server 14 is running MICROSOFT OUTLOOK, work folders 24 may comprise public folders that link to a task list, a calendar, an inbox, or any other suitable component or tool of MICROSOFT OUTLOOK.

Collaboration server 14 generally receives work items 28 from message server 12 and stores each work item 28 in the work folder 24 of the associated owner. In this regard, the work item 28 may be assigned to the owner and presented to the owner in an appropriate format using one or more components or tools of the communication software being utilized. For example, work item 28 may be accessible to its associated owner through the owner's work folder 24. As another example, the work item 28 may be presented in the form of a task item in the owner's task list. In another example, the work item 28 may be presented in the form of a scheduled event in the owner's calendar. In yet another example, the work item 28 may be presented in the form of an e-mail in the owner's inbox. An advantage of this type of proactive assignment of work items 28 according to the "active work" model is that the parties that are responsible for performing work are not depended upon to seek out the work. In a call center environment, this is particularly advantageous because it may be desirable to monitor the performance of the owners of work items 28. Communicating work items 28 to owners using work folders 24 of collaboration server 14 provides an opportunity to track the amount of work performed by the owners of work items 28 or the progress of associated work assignments against goals that are established according to, for example, the number of work items 28 that are communicated to a particular owner's work folder 24.

In one embodiment, database server 18 is coupled to dispatcher 30. Database server 18 may be a Structured Query Language (SQL) server or any other suitable type of server. Although described as a database, database server 18 may include any suitable data storage arrangement as is appropriate, and reference to a database is meant to encompass all such arrangements as are appropriate. For example, in a particular embodiment in which functionality of platform 12, collaboration server 14, message server 16, database server 18, and web server 20 are provided using a single computer system, database server 18 might be implemented using a memory of the computer system.

Database server 18 receives transaction information 36 associated with each session summary 22 from dispatcher 30 to be entered into a transaction table 38. Entries into transaction table 38 may depend on the type of session summary 22 received by dispatcher 30. For example, if dispatcher 30 receives a recording session summary 22, transaction table 20 may contain the time and date of the recording associated with the recording session summary 22, the parameters of the recording, for whom the recording was made (e.g., the owner identifier), why the recording was made (i.e., whether it was made as part of a recording plan or induced by a request), who (if anyone) is to receive notification of the recording, to which work folder 24 the work item 28 associated with the recording session summary 22 should be communicated (if there is a work assignment), the type of work item 28, or any other suitable entries.

In one embodiment, web server 20 associated with a user agent 40 may be coupled to active work server 32 to provide owners access to work folders 24 on collaboration server 14. Web server 20 may be any type of web server operable to provide access to work folders 24 on collaboration server 14. User agent 40 may be any suitable communications software such as, for example, MICROSOFT OUTLOOK, LOTUS NOTES, or NOVELL GROUPWISE. In one embodiment, user agent 40 may be software corresponding to the software running on collaboration server 14. For example, collaboration server 14 may run MICROSOFT EXCHANGE, and user agent 40 may be MICROSOFT OUTLOOK. In this regard, user agent 40 may be the "entry point" for an owner of work items 28 to access the owner's work folders 24. In certain embodiments, an owner may be able to organize the owner's work items 28, as well as "launch" or perform the work assignment associated with the owner's work items 28 using user agent 40.

In operation, work items 28 may be created, organized, and performed using the various components of system 10. The following discussion illustrates an example of creating work items 28. Platform 12 communicates session summaries 22 to message server 16. In a call center environment, platform 12 may communicate recording session summaries 22, survey session summaries 22, evaluation summaries 22, or any other suitable types of session summaries 22. Dispatcher 30 of message server 16 determines whether any of the session summaries 22 are associated with work assignments. Particular session summaries 22 comprise work information 34 if the session summary 22 is associated with a work assignment.

In a call center environment, for example, a client may participate in a customer service call with a customer, and the resulting voice session may be recorded. Platform 12 therefore communicates a session summary 22 to dispatcher 30. The session summary 22 may include a work assignment for a supervisor of the client to review the recording. In this regard, the session summary 22 may comprise a recording session summary 22. The session summary 22 may include a work assignment for the supervisor to evaluate the recording. In this regard, the session summary 22 may comprise an evaluation session summary 22. As another example, a customer participating in a customer service call with the call center may complete a survey detailing the caller's experience during the call. This may result in platform 12 communicating a survey session summary 22 to dispatcher 30. Survey session summary 22 may include a work assignment for a supervisor to review the survey.

If dispatcher 30 determines there is no work associated with session summary 22, dispatcher 30 awaits a next session summary 22 from platform 12. If dispatcher 30 determines work is associated with session summary 22, dispatcher 30 communicates work information 34 to active work server 32. Active work server 32 creates a work item 28 for those session summaries 22 associated with work assignments. Each work item 28 is based at least in part upon the corresponding work information 34 communicated by dispatcher 30.

Details of an example work item 28 are described below with reference to FIG. 2, but generally, work item 28 may include an owner identifier, a work item type, work instructions, work parameters, and/or links to any data and applications used to perform the work assignment associated with work item 28. For example, the owner identifier may indicate the owner of work item 28. The work item type may indicate if the work item is associated with a recording session, survey session, evaluation session, or any other suitable type of session. The work parameters may include any information that may be useful in organizing, sorting, or viewing the work item 28 (e.g., information regarding the client participating in a session, the priority of the work assignment, when the work assignment was assigned and when it is due, and information regarding the party that assigned the work assignment).

Active work server 32 determines if the owner of work item 28 has a work folder 24 on collaboration server 14. If the owner of work item 28 does not have a work folder 24 on collaboration server 14, active work server 32 creates a work folder 24 on collaboration server 14 for the owner of work item 28. If an appropriate work folder 24 is created or if one was already in existence, active work server 32 communicates the work item 28 to the collaboration server 14 for storage in the appropriate work folder 24. In certain embodiments, an owner's work folder 24 may comprise one or more work subfolders for different work item types. For example, a particular owner having recording work items 28, evaluation work items 28, and survey work items 28 may have corresponding work subfolders. Collaboration server 14 stores work items 28 received for a particular owner in the appropriate work subfolder according to the work item type. Active work server 32 may create the work subfolders dynamically as a particular owner is assigned a work item 28 with a particular work item 28 type for the first time. For example, the first time an owner receives a recording work item 28, a recording work subfolder may be created within the owner's work folder 24 for storing the recording work item 28.

Dispatcher 30 may also determine whether one or more notifications are associated with session summary 22. Notifications may include e-mail notifications to one or more persons or machines indicating a work item 28 is being sent to its owner. For example, particular officers, directors, or employees of a company may desire to monitor the progress of work assignments in the company. Notifications provide an indication to these groups or individuals that a work item 28 has been assigned and the identity of the owner responsible for performing the work assignment associated with work item 28. If appropriate, therefore, active work server 32 communicates notifications to the one or more persons or machines. The notification communication process may occur substantially simultaneously with active work server 32 creating and communicating work items 28 to work folders 24 on collaboration server 14.

In further operation, an owner of work items 28 may access work items 28 and perform the associated work assignments using the components of system 10. For example, an owner may access work items 28 using user agent 40. Security software associated with active work server 32 verifies the identity of the owner in cooperation with collaboration server 14 prior to providing an owner full access to work items 28. The security software may provide overall security up front to prevent unauthorized access to work folders 24. The security software may provide further or alternative security as an owner attempts to perform particular operations in system 10. In a particular embodiment, owners of work items 28 possess read-only capabilities of work folders 24 unless the owner's identity is successfully verified by the security software. If the owner's identity is successfully verified, the owner may access the various work items 28 stored in work folders 24.

The owner may organize work items 28 in the owner's work folder 24 by selecting an organizational operation associated with the communications software executed by collaboration server 14 and/or user agent 40. Organizational operations may include sorting, grouping, viewing, or otherwise organizing one or more work items 28 within a work folder 24. For example, an owner may be permitted to sort work items 28 according to the date by which the associated work assignment is due to be performed. This capability allows an owner to customize the owner's display. In certain embodiments, functionality provided by the organizational operations may be additional to any organizational operations provided by the communications software associated with collaboration server 14 and user agent 40.

An owner may "launch" work assignments associated with work items 28. "Launching" a work assignment associated with a work item 28 may include collecting any data and initiating any applications necessary to perform the work assignment. For example, when an owner double-clicks on a work item 28 in the owner's work folder 24, all data and applications necessary to perform the associated work assignment may be automatically retrieved, initiated, or generated. In one embodiment, work item 28 may be associated with a survey session summary 22, an evaluation session summary 22, or a recording session summary 22. If work item 28 is associated with a survey session summary 22, the survey associated with work item 28 is retrieved using the link from work item 28. As discussed above, a survey may be a questionnaire completed by a caller making a customer service call to a call center. An application necessary to display the survey is initiated, which may be a web browser, word processor, or other application capable of displaying a document. The application displays the survey. If work item 28 is associated with an evaluation session summary 22, the evaluation associated with work item 28 is retrieved using the link from work item 28. As discussed above, an evaluation may be a questionnaire to be filled out by a quality control manager (owner of work item 28). An application capable of displaying the evaluation is initiated, which may be a web browser, word processor, or any application capable of displaying a document. The application displays the evaluation. If work item 28 is associated with a recording session summary 22, the recording associated with work item 28 is retrieved using the link from work item 28. As discussed above, a recording may be a voice and/or data session recording conducted by a client in a call center environment. The recording may be an audio video interleave (AVI) file, Moving Pictures Experts Group (MPEG) file, WAV file, or any other suitably formatted recording. An application capable of playing back the recording is initiated, which may be REALPLAYER, WINDOWS MEDIA PLAYER, or any other suitable application operable to play back media files. The application plays back the recording.

Figure 2:
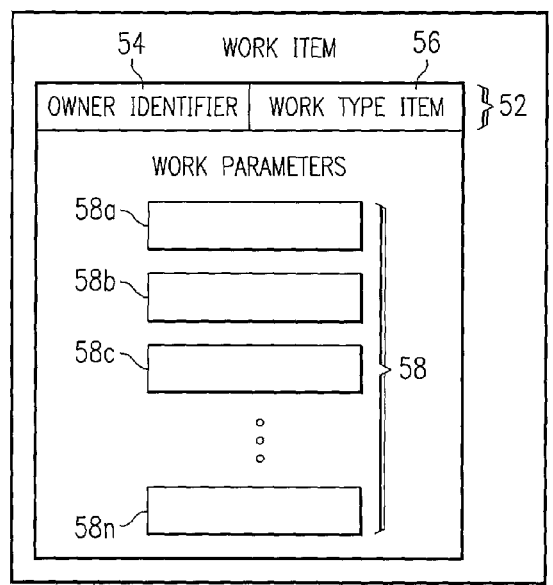
FIG. 2 illustrates one embodiment of a work item.
Figure 5:
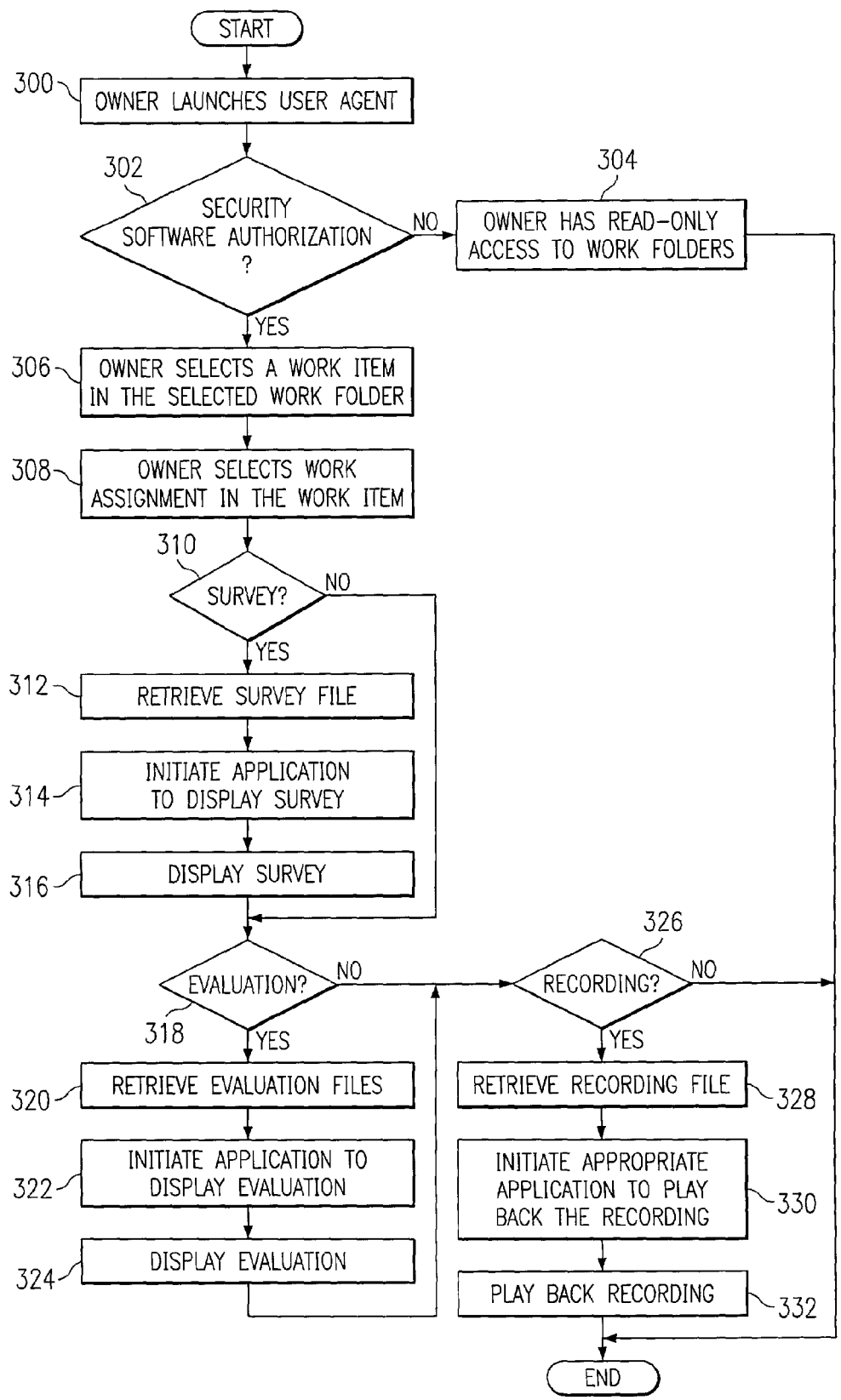
FIG. 5 is a flowchart of a method for launching work assignments associated with work items.

It is important to note that a work item 28 described in FIGS. 2 and 5 may be associated with more than one work item type. For example, a work item 28 associated with an evaluation (or a survey) may also be associated with a recording. In this case, an owner of work item 28 may desire to review the associated recording in order to complete the evaluation (or review the survey). Therefore, a recording may be played back to the owner first and then the evaluation (or survey) may be presented to the owner for completion.

Particular embodiments of the present invention may provide one or more technical advantages. For example, standard quality management processes passively assign work to owners responsible for performing that work in what may be referred to as a "passive work" model. This "passive work" model requires participants to proactively check if work is assigned to them. Certain embodiments of the present invention, however, proactively communicate work items 28 to an owner responsible for performing the work item 28. This is referred to as an "active work" model. Proactively communicating work items 28 to responsible owners may increase efficiency in quality management systems by ensuring that an owner of a work item 28 receives notice and information regarding the work in a timely manner, eliminating the need for owners of work items 28 to seek out their assigned work items 28. Proactively communicating work items 28 may also allow a work assignment within a work item 28 and the progress made in performing that work assignment to be more easily tracked and monitored. Certain embodiments of the present invention may also facilitate an owner's ability to perform the work assignment by allowing the owner to launch the work assignment from the owner's work folder. Providing this functionality may decrease the burden on owners of work items 28, easing the owners' burden to perform work assignments. Certain embodiments of the present invention may also allow owners of work items 28 to organize work items according to relevant work parameters.

FIG. 2 illustrates one embodiment of a work item 28 that includes a header 52 and work parameters 58. Header 52 comprises an owner identifier 54 and a work item type 56. Owner identifier 54 associates work item 28 with the owner of work item 28. In a particular embodiment, the owner of work item 28 may be a quality control manager or supervisor in a call center environment responsible for reviewing the work of clients or call center representatives receiving customer service calls. Work item type 56 may be determined by the type of session associated with the session summary 22 from which work item 28 was created. For example, work item 28 may be a session type 56, an evaluation type 56, or a recording type 56. Work parameters 58 comprise links associating the work item 28 to information and applications used to perform the associated work assignment; work instructions; and any information that may be useful in organizing work items 28.

FIG. 3 is a flowchart of a method for processing work. At step 100, dispatcher 30 receives a session summary 22 from platform 12. As stated above, platform 12 may communicate recording session summaries 22, survey session summaries 22, evaluation summaries 20, or any other suitable types of session summaries 22. At step 102, dispatcher 30 stores transaction information 36 in transaction table 38 on database server 18. Dispatcher 30 determines if work is associated with session summary 22 at step 104. If dispatcher 30 determines there is no work associated with session summary 22, execution returns to step 100. If dispatcher 30 determines work is associated with session summary 22, execution proceeds to step 106 where dispatcher 30 communicates work information 34 to active work server 32.

At step 108, active work server 32 creates a work item 28 for session summary 22. As described above, work item 28 may include owner identifier 54, work item type 56, and selected summary information 58, including links to any data and applications necessary to perform the work associated with work item 28. Active work server 32, at step 110, determines if the owner of work item 28 has an appropriate work folder 24 on collaboration server 14. If the owner of work item 28 does not have an appropriate work folder 24 on collaboration server 14, active work server 32 creates a work folder 24 on collaboration server 14 for the owner of work item 28, at step 112. If an appropriate work folder 24 is created at step 112 or if it was determined to exist at step 110, execution proceeds to step 114 where active work server 32 stores work item 28 in the work folder 24 of the appropriate owner. Execution terminates at step 116.

FIG. 4 is a flowchart of a method for organizing one or more work items 28. At step 200, an owner launches user agent 40. As stated above, user agent 40 may be any communications software such as, for example, MICROSOFT OUTLOOK, LOTUS NOTES, or NOVELL GROUPWISE. At step 202, security software associated with active work server 32 verifies the identity of the owner in cooperation with collaboration server 14 prior to providing an owner full access to work items 28. The security software may provide overall security up front to prevent unauthorized access to work folders 24. In another embodiment, the security software may provide additional or alternative security as an owner attempts to perform particular operations in system 10. If no authorization is detected at step 202, execution proceeds to step 204 where owners of work items 28 possess read-only capabilities of work folders 24. If the security software successfully verifies the owner's identity, as determined at step 202, execution proceeds to step 206 where the owner selects an organizational operation for work items 28. Organizational operations may include sorting one or more work items 28 within a work folder 24, grouping one or more work items 28 within a work folder 24, and viewing work items 28 within a work folder 24. These organizational operations may be performed based at least in part upon work parameters 58. In certain embodiments, functionality provided by the organizational operations may be additional to any organizational operations provided by the communications software associated with collaboration server 14 and user agent 40. At step 208, if the owner possesses the right to request the organizational operation, the organizational operation is performed. Execution terminates at step 210.

FIG. 5 is a flowchart of a method for launching work assignments associated with work items 28. Launching work assignments associated with a work item 28 may include collecting any data and initiating any applications used to perform the work. At step 300, an owner launches user agent 40. As stated above, user agent 40 may be any communications software such as, for example, MICROSOFT OUTLOOK, LOTUS NOTES, or NOVELL GROUPWISE. At step 302, security software associated with active work server 32 verifies the identity of the owner in cooperation with collaboration server 14 prior to providing an owner full access to work items 28. The security software may provide overall security up front to prevent unauthorized access to work folders 24. In another embodiment, the security software may provide additional or alternative security as an owner attempts to perform particular operations in system 10. In a particular embodiment, an owner only has rights to launch work associated with work items 28 in the owner's work folder 24. If the security software does not successfully verify the owner's identity, as determined at step 302, execution proceeds to step 304 where the owner may be given read-only access to work folders 24. If the security software successfully verifies the owner's identity at step 302, execution proceeds to step 306 where the owner may process a work item 28.

It is determined at step 310, whether the work item type 56 of active work item 28 is survey. If so, execution proceeds to step 312 where the survey associated with work item 28 is retrieved using, for example, a link from work item 28. As discussed above, a survey may be a questionnaire completed by a caller making a customer service call to a call center. At step 314, an application necessary to display the survey is launched. The application may be a web browser, word processor, or other application capable of displaying a document. The application displays the survey at step 316 for review by the owner of work item 28. After completion of step 316 or if the work item type 56 of work item 28 is not survey as determined at step 310, execution proceeds to step 318.

It is determined at step 318 whether the work item type 56 of work item 28 is evaluation. If so, execution proceeds to step 320 where the evaluation associated with work item 28 is retrieved using, for example, a link from work item 28. As discussed above, an evaluation may be a questionnaire to be filled out by a quality control manager responsible for evaluating, for example, a voice and/or data session recording conducted by a client in a call center environment. At step 322, an application capable of displaying the evaluation is launched. The application may be a web browser, word processor, or any application capable of displaying a document. The application presents the evaluation at step 324 for completion by the owner of work item 28. After completion of step 324 or if the work item type 56 of work item 28 is not evaluation as determined at step 318, execution proceeds to step 326.

It is determined at step 326 whether the work item type 56 of work item 28 is recording. If so, execution proceeds to step 328 where the recording associated with work item 28 is retrieved using, for example, a link from work item 28. As discussed above, a recording may be a voice and/or data session recording conducted by a client in a call center environment. The recording may be an audio video interleave (AVI) file, Moving Pictures Experts Group (MPEG) file, WAV file, or any other suitably formatted recording. At step 330, an application capable of playing back the recording is launched. The application may be REALPLAYER, WINDOWS MEDIA PLAYER, or any other suitable application operable to play back media files. At step 332, the application plays back the recording for review by the owner of work item 28.

It is important to note that a work item 28 described in FIGS. 2 and 5 may be associated with more than one work item type 56. For example, a work item 28 associated with an evaluation (or survey) may also be associated with a recording. In this case, an owner of work item 28 may desire to review a recording in order to complete the evaluation (or survey). In these circumstances, the appropriate information and applications may be launched in order to play back the recording in association with the evaluation (or survey).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for processing work items, comprising:
a dispatcher operable to:
receive a plurality of messages; and
automatically determine if any of the plurality of messages is associated with a work assignment; and
a computer system having an active work server communicatively coupled to the dispatcher and operable to:
receive work information associated with at least one message determined automatically by the dispatcher to be associated with a work assignment;
automatically create, in response to receiving the work information associated with at least one message determined by the dispatcher to be associated with a work assignment, a work item associated with the at least one message based at least in part upon the work information associated with at least one message determined by the dispatcher to be associated with a work assignment, wherein the work item comprises an owner identifier; and
automatically communicate the work item to an owner associated with the owner identifier.

2. The system of claim 1, wherein the message comprises a session summary associated with at least one of a recording session, a survey session, and an evaluation session.

3. The system of claim 1, wherein each message comprises work information if it is associated with a work assignment.

4. The system of claim 1, wherein the work information further comprises work instructions to perform the work assignment.

5. The system of claim 4, wherein the work item further comprises the work instructions.

6. The system of claim 1, wherein the work information further comprises a work type.

7. The system of claim 6, wherein the work item further comprises the work type.

8. The system of claim 1, wherein the work assignment is associated with at least one of:
completing an evaluation;
reviewing a recording; and
reviewing a survey.

9. The system of claim 8, wherein the work information further comprises a link to at least one of the evaluation, the recording, and the survey.

10. The system of claim 8, wherein the work item further comprises a first link to at least one of the evaluation, the recording, and the survey.

11. The system of claim 10, wherein the work item further comprises a second link to at least one application used to perform the work assignment.

12. The system of claim 11, further comprising a collaboration server having a plurality of work folders associated with a plurality of owners and operable to:
retrieve at least one of the evaluation, the recording, or the survey based on the first link; and
launch at least one application based upon the second link.

13. The system of claim 1, further comprising a collaboration server having a plurality of work folders associated with a plurality of owners.

14. The system of claim 13, wherein at least one work folder associated with the owner indicated by the owner identifier is operable to store the work item communicated by the active work server.

15. The system of claim 14, wherein the collaboration server is operable to present the work item to the owner using a communication tool.

16. The system of claim 13, wherein the collaboration server is operable to organize a plurality of work items associated with a particular owner.

17. The system of claim 13, wherein the active work server is operable to create a work folder for the owner indicated by the owner identifier, and further operable to communicate the work item to the created work folder.

18. The system of claim 13, further comprising a web server associated with the active work server and a user agent, the web server operable to:
verify the identity of an owner; and
provide the owner access to an associated work folder via the user agent, in response to verifying the identity of the owner.

19. A method for processing work items, comprising:
receiving a plurality of messages;
automatically determining if any of the plurality of messages is associated with a work assignment;
automatically identifying work information associated with at least one message determined to be associated with a work assignment;
automatically creating, in response to receiving the work information associated with at least one message determined by the dispatcher to be associated with a work assignment, a work item associated with the at least one message based at least in part upon the work information associated with at least one message determined by the dispatcher to be associated with a work assignment, wherein the work item comprises an owner identifier; and automatically communicating the work item to an owner associated with the owner identifier wherein the steps of receiving, determining, identifying, creating and communicating are performed in a computer system.

20. The method of claim 19, wherein the message comprises a session summary associated with at least one of a recording session, a survey session, and an evaluation session.

21. The method of claim 19, wherein each message comprises work information if it is associated with a work assignment.

22. The method of claim 19, wherein the work information further comprises work instructions to perform the work assignment.

23. The method of claim 22, wherein the work item further comprises the work instructions.

24. The method of claim 19, wherein the work information further comprises a work type.

25. The method of claim 24, wherein the work item further comprises the work type.

26. The method of claim 19, wherein the work assignment is associated with at least one of:
   completing an evaluation;
   reviewing a recording; and
   reviewing a survey.

27. The method of claim 26, wherein the work information further comprises a link to at least one of the evaluation, the recording, and the survey.

28. The method of claim 26, wherein the work item further comprises a first link to at least one of the evaluation, the recording, and the survey.

29. The method of claim 28, wherein the work item further comprises a second link to at least one application used to perform the work assignment.

30. The method of claim 29, further comprising:
   retrieving at least one of the evaluation, the recording, or the survey based on the first link; and
   launching at least one application based on the second link.

31. The method of claim 19, further comprising storing the work item in a work folder associated with the owner indicated by the owner identifier.

32. The method of claim 19, further comprising:
   creating a work folder for the owner indicated by the owner identifier;
   and communicating the work item to the created work folder.

33. A system for processing work items in a call center environment, comprising:
   a dispatcher operable to:
      receive a plurality of messages each comprising a session summary associated with a session between a call center representative of the call center and a caller to the call center; and
      automatically determine if any of the plurality of messages is associated with a work assignment, a work assignment comprising one or more of completing an evaluation of a session, reviewing a recording associated with a session, and reviewing a survey associated with a session; and
   a computer system having an active work server communicatively coupled to the dispatcher and operable to:
      receive work information associated with at least one message automatically determined by the dispatcher to be associated with a work assignment;
      automatically create a work item associated with the at least one message based at least in part upon the work information, wherein the work item comprises an owner identifier; and
      automatically communicate the work item to an owner associated with the owner identifier for performance of the work assignment associated with the work item.

* * * * *